(12) United States Patent
Higgins

(10) Patent No.: US 6,439,131 B1
(45) Date of Patent: Aug. 27, 2002

(54) CONVERTIBLE HIGHWAY AND RAIL FREIGHT VEHICLE

(76) Inventor: Joseph M. Higgins, 881 N. Highland Ave., Apt. 16, Atlanta, GA (US) 30306

( * ) Notice: Subject to any disclaimer, the term of this patent is extended or adjusted under 35 U.S.C. 154(b) by 0 days.

(21) Appl. No.: 09/842,964

(22) Filed: Apr. 27, 2001

(51) Int. Cl.⁷ .................................................. B61F 5/04
(52) U.S. Cl. .................. 105/215.2; 105/159; 105/72.2; 296/181; 206/508; 220/1.5
(58) Field of Search ........................ 105/215.1, 215.2, 105/159, 157.2, 158.1, 72.2; 220/1.5; 206/508, 509, 511; 296/181

(56) References Cited

U.S. PATENT DOCUMENTS

| | | |
|---|---|---|
| 2,140,121 A | 12/1938 | Tomkins |
| 2,215,886 A | 9/1940 | Ronk |
| 2,263,578 A | 11/1941 | Hickman |
| 2,879,719 A | 3/1959 | Gaebler |
| 3,002,469 A | 10/1961 | Wanner |
| 3,332,362 A | 7/1967 | Fisher |
| 4,316,418 A | 2/1982 | Hindin et al. |
| 4,381,713 A | 5/1983 | Cripe |
| 4,448,132 A | 5/1984 | Beatty |
| 4,527,486 A | * 7/1985 | Baird et al. ............. 105/215 C |
| 4,844,672 A | * 7/1989 | Yurgevich ................... 410/54 |
| 5,050,897 A | * 9/1991 | Stromberg .................. 280/43 |
| 5,220,870 A | * 6/1993 | Larson ...................... 105/159 |
| 5,934,695 A | * 8/1999 | Rowland ............... 280/33.998 |

FOREIGN PATENT DOCUMENTS

| | | | |
|---|---|---|---|
| EP | 0345538 A2 | * | 12/1989 |
| JP | 09020384 A | * | 1/1997 |
| JP | 09020387 A | * | 1/1997 |

* cited by examiner

*Primary Examiner*—S. Joseph Morano
*Assistant Examiner*—Frantz F. Jules
(74) *Attorney, Agent, or Firm*—Rodgers & Rodgers

(57) ABSTRACT

A freight vehicle adapted to be convertible from highway to railway use and vice versa including a trailer having multiple railway wheels and highway wheels pivotally connected to the underside of the trailer and with the wheels being extendible for operational use and retractable for storage and multiple indentations formed in the roof of the vehicle for receiving the retracted highway wheels of a trailer stacked thereabove.

2 Claims, 2 Drawing Sheets

CONVERTIBLE HIGHWAY AND RAIL FREIGHT VEHICLE

BACKGROUND OF THE INVENTION

This is invention relates to freight vehicles that are readily converted from highway use to railway use and vice versa. It is generally known to equip highway vehicles, such as long-haul truck trailers, with railway wheels which are pivotally mounted on the truck trailer and are withdrawn upwardly into a highway mode such that the truck wheels extend downwardly for highway operation. In the railway mode, the railway wheels are swung downwardly and the highway wheels are swung upwardly by hydraulic means to convert the vehicle for use on a railroad track. When it is necessary to stack the truck trailers on top of each other for transporting large amounts of freight, the highway wheels even in the retracted positions, of necessity, extend below the bottom of the trailer and utilize valuable storage space and create an unstable stacked arrangement.

SUMMARY OF THE INVENTION

By this invention, truck trailers are convertible from highway to railway use and vice versa with highway wheels and railway wheels pivotally mounted on the underside of the truck trailer. Indentations are formed in the top of the truck trailer for receiving the highway wheels of a trailer stacked on top thereof.

DETAILED DESCRIPTION OF THE INVENTION

Figure 1:
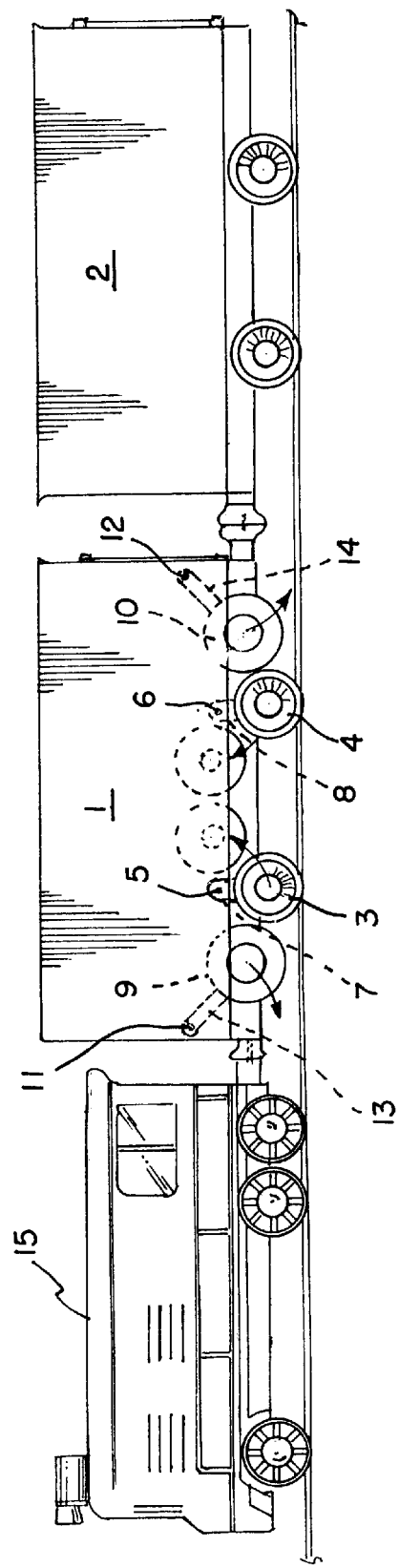
FIG. 1 is a side elevational view of tandem truck trailers converted to railway use.

In the drawings and with particular reference to FIG. 1, a pair of conventional truck trailers are designated by numerals 1 and 2. Specifically, trailer 1 is provided with a pair of railway wheels 3 and 4 which are pivotally mounted on the underside of trailer 1 at pivots 5 and 6 by means of arms 7 and 8, respectively. In like manner, highway wheels 9 and 10 are pivotally mounted on the underside of trailer 1 at pivot points 11 and 12 by means of arms 13 and 14, respectively, as shown in detail in the drawings in connection with trailer 1. Although not shown in the drawings, the same railway and highway wheel structure is utilized in connection with trailer 2.

For purpose of railway operation, railway wheels 3 and 4 are simply pivoted downwardly by known means, such as hydraulically or pneumatically, into the positions shown in FIG. 1 whereby they come into contact with the railroad track. The entire apparatus is pulled by means of conventional railway engine 15.

Figure 2:
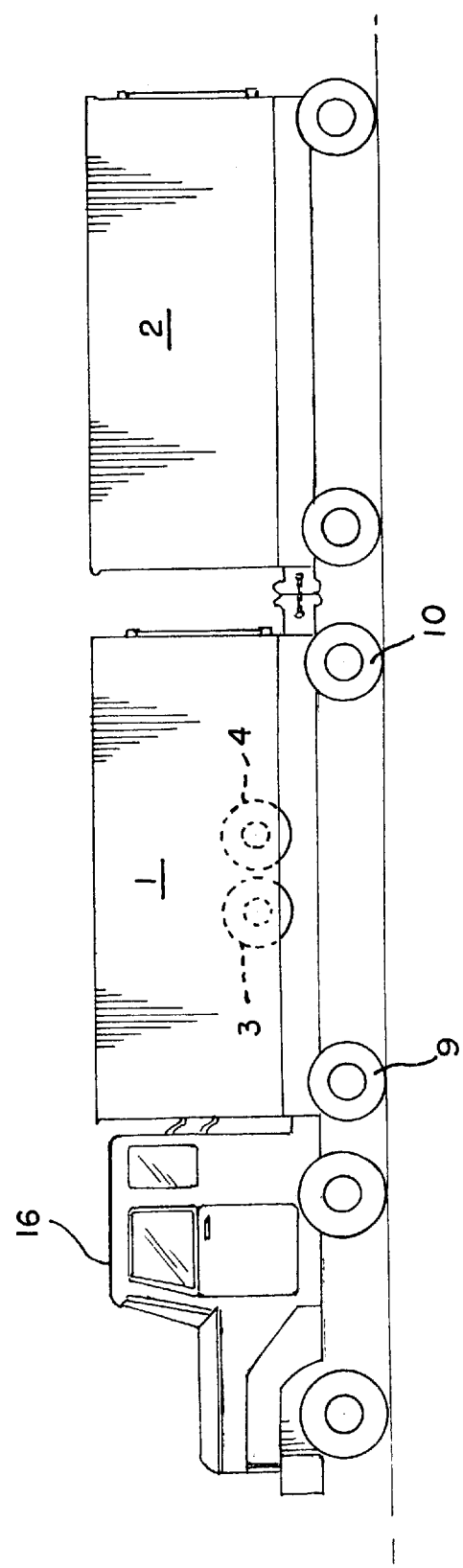
FIG. 2 is a side elevational view of tandem truck trailers in a highway operational mode.
Figure 3:
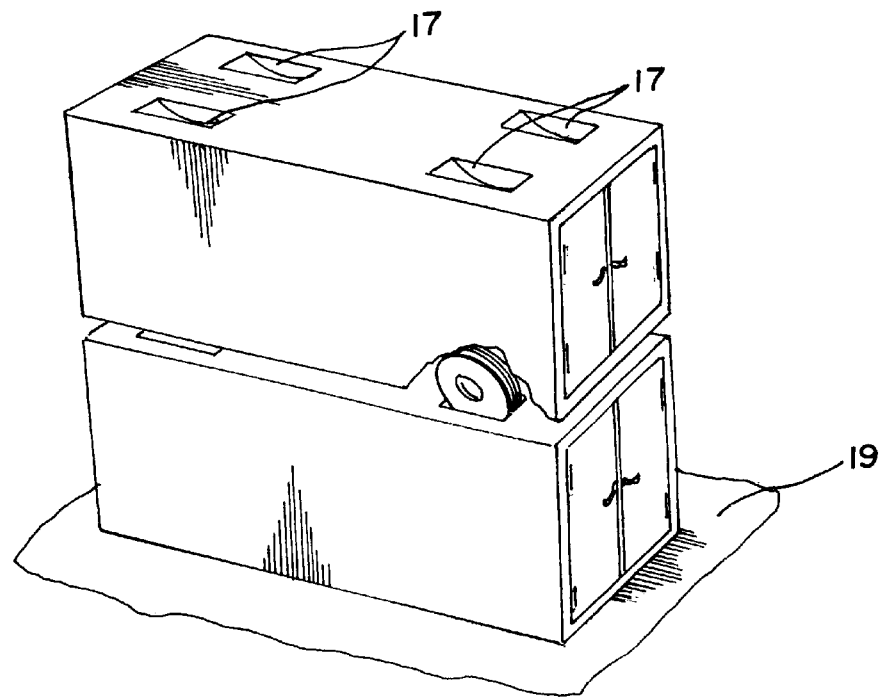
FIG. 3 is a perspective view showing a pair of trailers stacked one upon the other.

In order to convert the truck trailers from railway operation, as shown in FIG. 1, to highway operation shown in FIG. 2, it is simply necessary for highway wheels 9 and 10 to be pivoted downwardly whereby they come in contact with the highway surface and railway wheels 3 and 4 pivoted upwardly into a storage condition. Truck 16 is then simply attached to trailer 1 in known manner for purposes of highway travel.

In the transportation of freight trailers in interstate or international commerce, it is often necessary to stack two or more trailers vertically for movement over a railway or shipment on an ocean-going freighter. It is impractical to fully retract highway wheels 9 and 10 fully into the body of the truck trailer, since valuable storage space would be thereby utilized within the trailer. In actual operation, highway wheels 9 and 10 extend downwardly below the bottom of the trailer.

Figure 4:
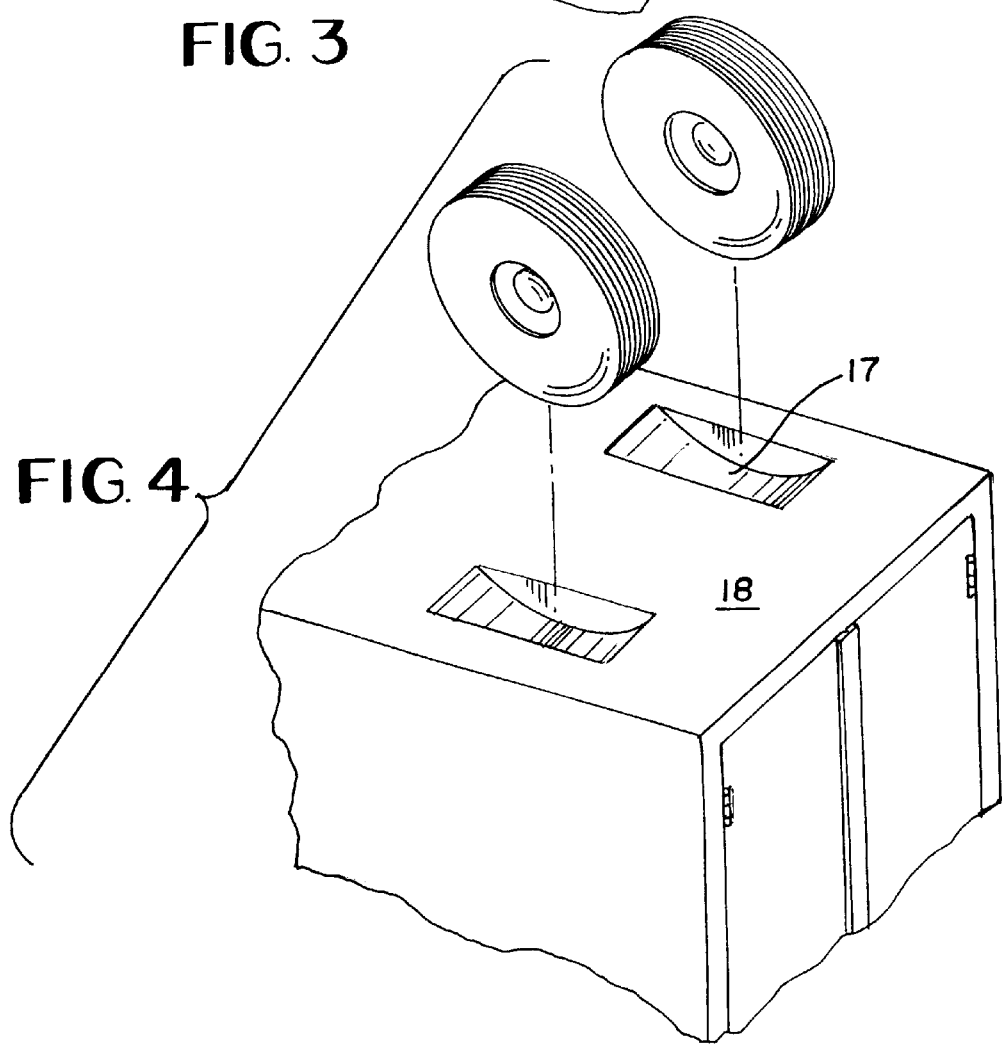
FIG. 4 is an enlarged perspective view showing indentations formed in the top of the lower trailer.

According to this invention, indentations 17 are formed in top 18 of truck trailers 1 and 2. As best shown in FIG. 4, indentations 17 generally conform to the shape of the lower portion of the trailer highway wheels. The number and spacing of indentations 17 on the lower trailer corresponds to the number and spacing of the highway wheels on the trailer stored immediately thereabove.

If it is desired to stack multiple trailers for long-distance transportation, one trailer is simply lifted by means of a crane and positioned on top of another trailer such that the wheels of the top trailer are positioned in corresponding indentations 17 in the roof of the trailer disposed immediately therebelow.

When the trailers are stacked in a sea-going freighter, indentations similar to that shown in connection with the trailer in FIG. 4 are formed in a pallet 19 which is positioned on the floor of the freighter.

Therefore, by this invention, normally wasted space between stacked truck trailers is conserved and undesirable shifting movement between adjoining trailers is prevented.

What is claimed is:

1. A vehicle convertible between highway and railway use combining an enclosure defined in part by an underside and a roof generally parallel thereto, said vehicle comprising multiple railway wheels pivoted to said underside, multiple highway wheels pivoted to said underside, said wheels adapted to be extended for operational use and retracted for storage, said highway wheels extending at least in part below said underside when in said storage mode, multiple indentations formed in said roof and being adapted to receive the highway wheels of another vehicle disposed thereabove, a pallet disposed below said vehicle, multiple indentations formed in said pallet, and said highway wheels of said vehicle being disposed respectively in said indentations formed in said pallet.

2. A vehicle according to claim 1 wherein said indentations conform generally to said portion of said highway wheels disposed therein.

* * * * *